United States Patent [19]

Nygren, Jr.

[11] Patent Number: 5,603,595
[45] Date of Patent: Feb. 18, 1997

[54] FLYWHEEL NUT SEPARABLE CONNECTOR AND METHOD

[75] Inventor: William D. Nygren, Jr., Denver, Colo.

[73] Assignee: Martin Marietta Corp., Bethesda, Md.

[21] Appl. No.: 420,424

[22] Filed: Apr. 12, 1995

[51] Int. Cl.$^6$ ............................ F16B 31/00; F16B 33/04; F16B 35/00
[52] U.S. Cl. .............................. 411/366; 411/6; 411/354; 411/916; 403/343; 29/446
[58] Field of Search ........................ 403/DIG. 3, DIG. 4, 403/343; 29/446, 452; 411/8–14, 6, 354, 366, 428, 432, 433, 551–555, 916, 956, 961, 962

[56] References Cited

U.S. PATENT DOCUMENTS

| | | |
|---|---|---|
| 2,840,404 | 6/1958 | Weber, Jr. . |
| 3,405,593 | 10/1968 | Kriesel . |
| 3,804,358 | 4/1974 | Gunther ............................ 411/555 X |
| 4,410,293 | 10/1983 | Elias et al. . |
| 4,929,135 | 5/1990 | DeLarue et al. ...................... 411/354 |
| 5,123,794 | 6/1992 | Pike .................................. 411/916 X |
| 5,160,180 | 11/1992 | Mlynarczyk ....................... 411/433 X |
| 5,160,233 | 11/1992 | McKinnis . |
| 5,221,171 | 6/1993 | Rudoy et al. . |
| 5,248,233 | 9/1993 | Webster . |
| 5,282,709 | 2/1994 | Chaput et al. . |
| 5,378,100 | 1/1995 | Fullerton . |

OTHER PUBLICATIONS

Bill Purdy, "Advanced Release Technologies Program Report" Naval Research Lab, 16 pages.
C & H Technology, Inc Technical Data Sheet Model 9421–2 Non-explosive Separation Nut 5 pages.
Fokker Thermal Knife Description Sheet, 1 page.
Starsys Research Co. Brochure for High Output Paraffin Linear Motors, 4 pages.
TiNi Alloy Co., Product Information Sheet for Frangibolt 2 pages.

*Primary Examiner*—Neill R. Wilson
*Attorney, Agent, or Firm*—Sandeep Seth Lowe, Meyer & Seth

[57] ABSTRACT

A method and apparatus for separably connecting a first surface to a second surface. The apparatus includes a connecting member provided with a threaded end. A rotatable body threadably engagable with the threaded end is rotatably supported against the first surface for rotation about the threaded end to separably connect the connecting member. The rotatably supported body and the connecting member are restrained from rotation. The connecting member and rotatably supported body further have a selected matching thread geometry such that a tensile load applied to the member when connected with the rotatably supported body is resolved as a torque applied to the rotatably supported body sufficient to urge the body to rotate. When the rotatably supported body is released and allowed to rotate, the threaded member translates and threadably disengages the rotatably supported body to separate the connection. The mass moment of inertia of the rotatably supported body and the thread geometry are selected such that preferably over ninety percent of the strain energy not dissipated as heat due to friction is converted into rotational kinetic energy of the rotating body and less than ten percent is converted into translational kinetic energy of the connecting member.

23 Claims, 8 Drawing Sheets

FIG. 13

FLYWHEEL NUT SEPARABLE CONNECTOR AND METHOD

BACKGROUND OF THE INVENTION

This invention relates generally to separable connection devices, and more particularly, to an improved non-pyrotechnic separable connector for minimizing shock during rapid separation.

Separation devices have long been used in a variety of applications to connect structures until it its desired to have the structures separate, and many such devices are known in the art. In many applications several separable connectors are used to form a connection and must be able to separate the connection simultaneously or nearly so. Thus, each of the separable connectors must accomplish separation quickly to prevent timing problems. However, in accomplishing a quick separation, some devices cause shock to occur duration separation. In some cases, the shock is due to the operation of the separable connector itself, such as in the case of pyrotechnically driven separable connectors. In other cases, the shock is due to the separable connector quickly releasing the strain energy stored in the connection, when the connection is under a high pre-load, without converting or diverting the strain energy in a harmless manner. In many applications the connection is under a significant pre-load to maintain stiffness or prevent gapping in the connection. The rapid release of chemical, mechanical, or strain energy from the connection can be harmful to surrounding components causing a host of problems in many applications such as optical and electrical component failure. Other problems associated with pyrotechnic release devices include increased safety cost, increased electrical cable shielding weight, and ordinance storage cost to name a few.

Some prior separable connectors have, for example, used a segmented nut which is explosively actuated to release a member to which it is engaged, causing a great deal of chemical energy to be released as shock during separation. One such device, disclosed in U.S. Pat. No. 3,405,593 to Kriesel, uses a pyrotechnic event to move a piston to break a frangible member holding a segmented nut together to cause the nut to separate and release its connecting member thus allowing separation. While separation occurs in a desirably brief period of time, approximately 7–10 milliseconds, this device, not only does not harmlessly direct strain energy released during separation, but also adds chemical energy to the system which is also rapidly released as shock during separation. Some devices have attempted to reduce the shock produced by rapid strain energy release through the gradual release of high pre-load force. For example, U.S. Pat. No. 4,410,293 uses a first pyrotechnic separation bolt assembly to release a split nut surrounded by a yieldable assembly to first release the pre-load, and a second pyrotechnic separation bolt assembly to cause the final separation. However, this device also adds chemical energy to the system which is rapidly released during separation.

Other separation devices have been fashioned to provide non-pyrotechnically actuated separation of a segmented nut. For example, U.S. Pat. No. 5,221,171 uses a remotely controlled spring biased locking sleeve in which the spring is used to push the sleeve off the segmented nut to allow it to radially separate and thereby release its connecting member. While suitable for its purpose, this device still adds to the total energy of the connection system, in the form of mechanical energy of the spring, which also creates its own shock when released during separation. Additionally, as with pyro-technically actuated devices for which the amount of chemical energy necessary to separate the nut increases for larger pre-loads, larger amounts of spring energy are required for larger pre-loads to push the sleeve in this device.

Some prior art devices do utilize actuators which do not add a significant amount of energy to the total energy of the connection system. For example, U.S. Pat. No. 5,282,709 shows a separable connector which utilizes a segmented nut enclosed by a radially movable segmented spool bounded by a retaining wire which releasably holds the nut together without adding potentially harmful energy to the connection. One drawback to this device is that it either requires a large amount of electrical power for actuation or some means for external mechanical actuation. Another example is U.S. Pat. No. 5,160,233 which discloses a separable connector using a shape memory alloy to causes a piston to translate to allow separation. These devices, however, do not also address the problem of quick strain energy release during separation.

Other devices do attempt to eliminate strain release shock forces without adding harmful energy to the connection, such as by using shape memory alloys in a manner to relieve pre-load prior to separation. For example, U.S. Pat. No. 5,248,233 utilizes a shape memory alloy which is shrunken to relieve pre-load. In addition to other disadvantages, such as having a limited stroke to relieve the pre-load, this device does not provide a quick separation and the timing and speed problems associated with non-simultaneous separation exist when a plurality of these devices are used to form a separable connection.

It would be advantageous if a separable connector could be driven by the strain energy stored in the pre-loaded connection itself, rather than by adding excessive external energy to the connection system to drive the separation. It would further be advantageous for the separable connector to allow the stored strain energy to be released quickly yet diverted in such a manner so that minimal strain energy release shock is created during the separation. If would highly advantageous if the level of shock created during separation in the use of such a device was low enough to significantly reduce the need for conducting shock testing prior to use in a particular application, a time consuming and costly procedure. It would further be advantageous if the device was reusable so that the device itself could be functionally tested prior to use. It would further be advantageous if the device should be easily resetable without disassembly.

SUMMARY OF THE INVENTION

Accordingly, an apparatus of the present invention for separably connecting a first surface to a second surface is provided and includes a translatable connecting member having a threaded end. A rotatable body is rotatably supported against the first surface for rotation about the threaded end of the connecting member. The rotatable body is threadably engagable with the threaded end of the connecting member to create a separable connection with the connecting member. Means are provided to releasably restrain the rotatable body to prevent it from rotating until released. Means are provided to apply a selected tensile load to the connecting member, to pre-load the connection created between the connecting member and the rotatably supported body causing stain energy to be stored in the connection. The apparatus is also provided with means for preventing the threaded end of the connecting member from rotating.

The threaded release end is provided with a selectable thread geometry including thread pitch diameter, thread lead, thread angle, and helix angle such that, when the connection is placed under the pre-load by tensioning the connecting member against the second surface, the thread geometry causes the tensile load to be resolved as a torque applied to the rotatable body sufficient to cause the body to rotate when released. Other parameters including mass moment of inertia of the rotatable body, the resistive torque on the rotatable body due to thread friction with the threaded end, and resistive torque on the rotatable body due to friction at the load bearing surface, are controlled such that the applied torque causes a significant amount of the strain energy stored in the pre-loaded connection, and not dissipated as heat due to friction, to be harmlessly and quickly converted into rotational kinetic energy of the rotating body during separation. A small portion of the strain energy is also converted into translational kinetic energy of the connecting member causing it to translate relative to the rotatable body. Due to the rotation of the rotatable body, and the translation of the connecting member, the threaded end threadably disengages the rotatable body allowing the connection to separate. In this manner, shock due to stain energy release during separation is minimized with preferably more than ninety percent of the strain energy stored in the pre-loaded connection, and not dissipated as heat due to friction, relatively harmlessly converted into rotational kinetic energy of the rotatable body, and less than ten percent of the strain energy in the connection not dissipated as heat due to friction converted into linear kinetic energy of the threaded end. Furthermore, no additional potentially harmful energy has been added to the system to drive the separation and, in many cases, the level of separation shock created in the use of the present invention is sufficiently low to obviate the need for shock testing prior to actual use.

BRIEF DESCRIPTION OF THE DRAWINGS

Other objects, features, and advantages of the present invention will become more fully apparent from the following detailed description of several preferred embodiments, the appended claims and with reference to the accompanying drawings forming a part of the specification, wherein:

DETAILED DESCRIPTION OF PREFERRED EMBODIMENTS

Figure 10:
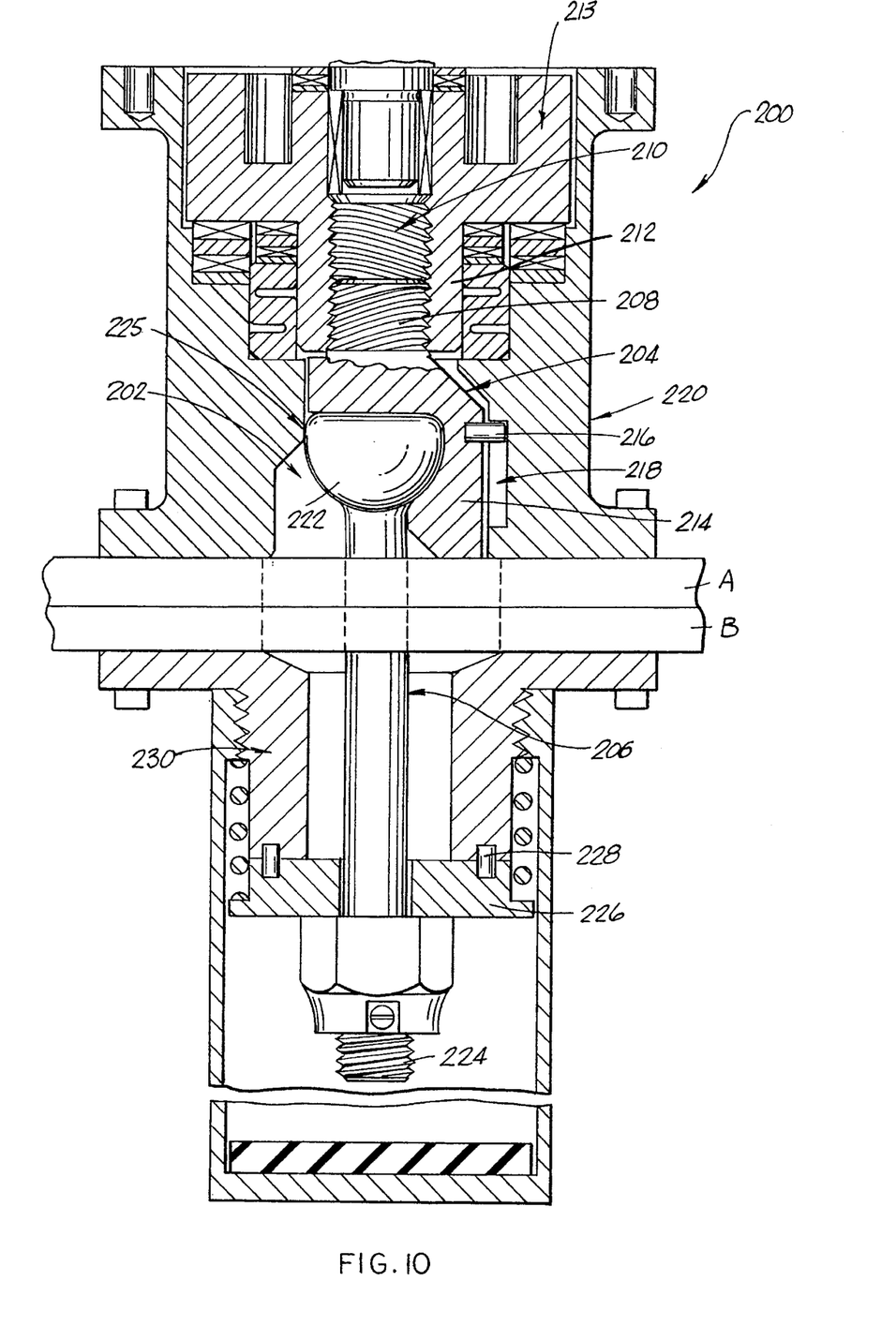
FIG. 10 is a section view showing a modified flywheel nut housing of one alternate embodiment of the present invention utilizing a connecting member formed from two joined pieces connecting the flanges.
Figure 11:
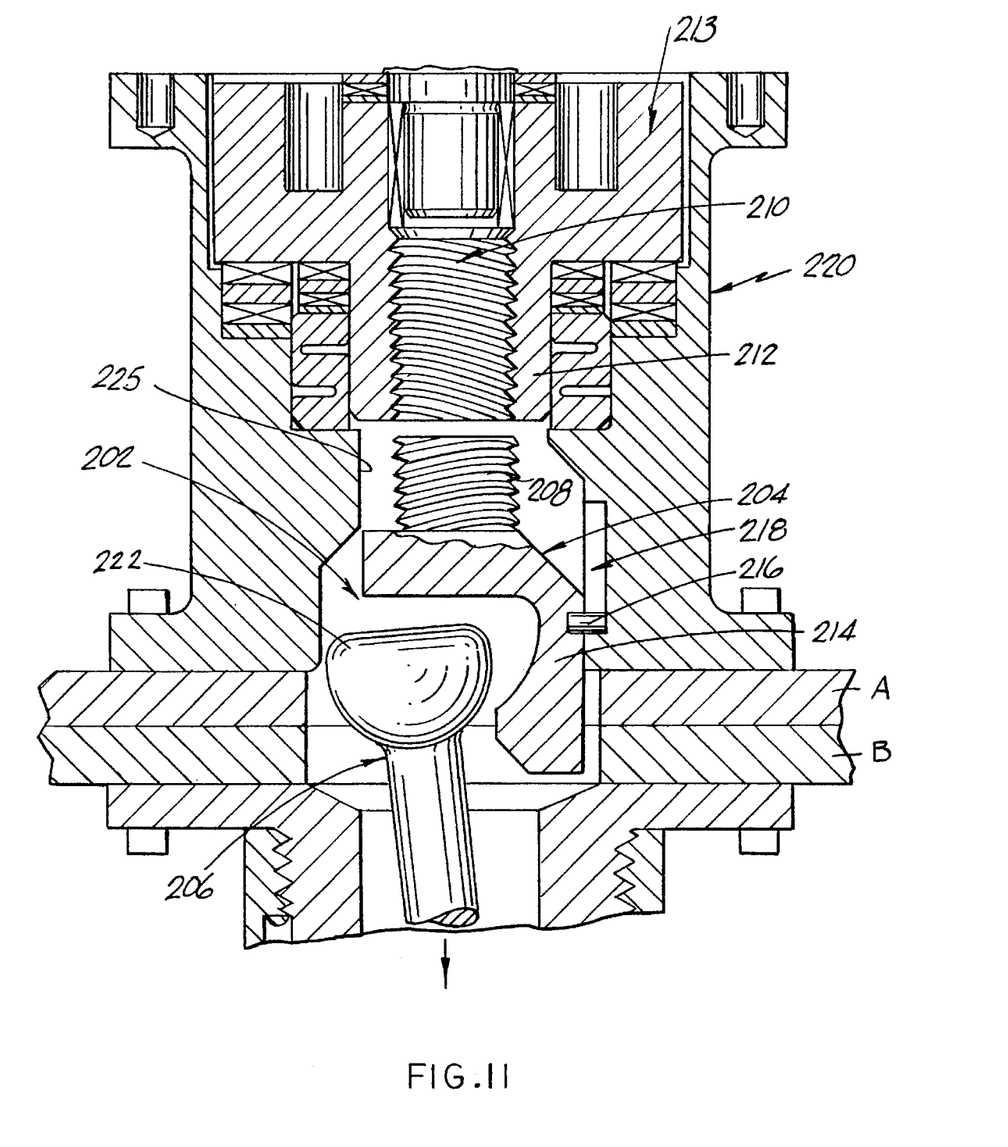
FIG. 11 is a section view of the alternate embodiment of FIG. 10 showing the two pieces of the connecting member unjoined and released from the flywheel nut to allow the flanges to separate.
Figure 12:
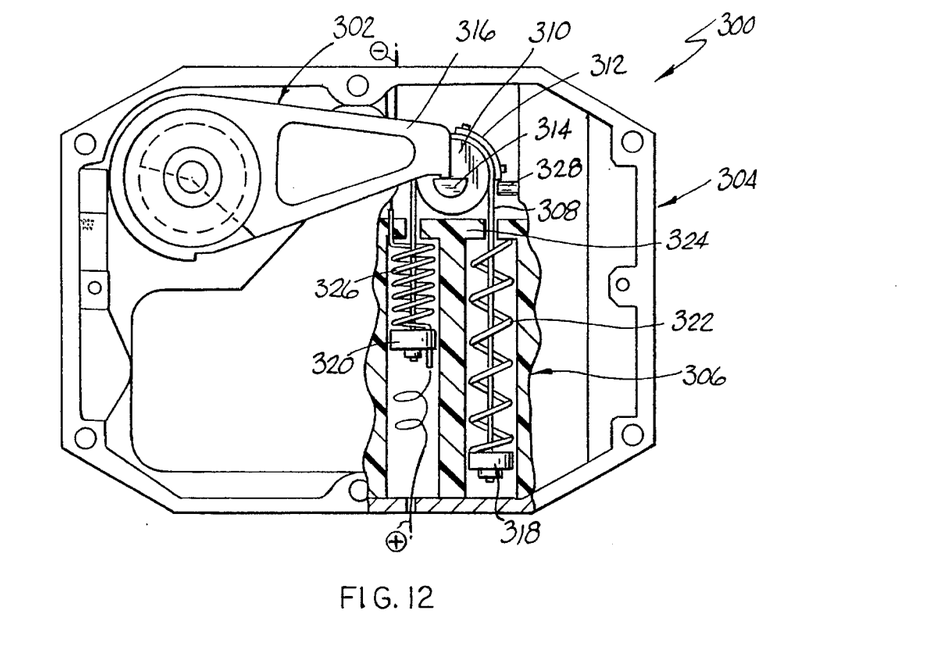
FIG. 12 is a plan view of the latch housing of a second alternate embodiment of the present invention having a spring driven rotary actuator and a single latch in its latched state.
Figure 13:
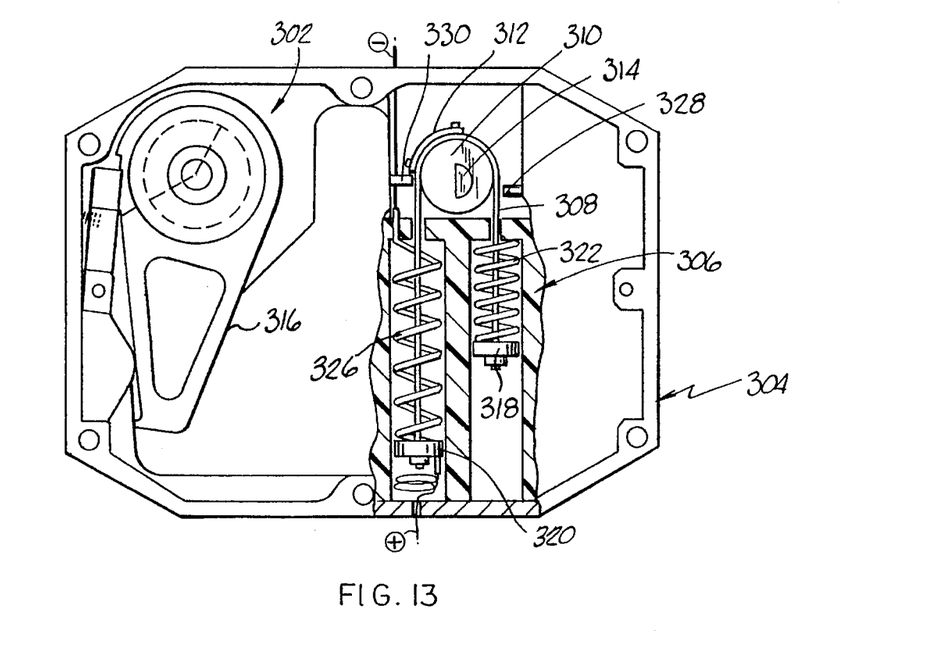
FIG. 13 is a plan view of the alternate embodiment of FIG. 12, showing the actuator in a second position and the latch in an unlatched state.

FIGS. 1–9 illustrate by way of example a first preferred embodiment of a separable connector 100 which utilizes the principles of the present invention. FIGS. 10, 11 illustrate a first alternate embodiment 200 of the present invention and FIGS. 12, 13 illustrate a second alternate embodiment 300.

Figure 1:
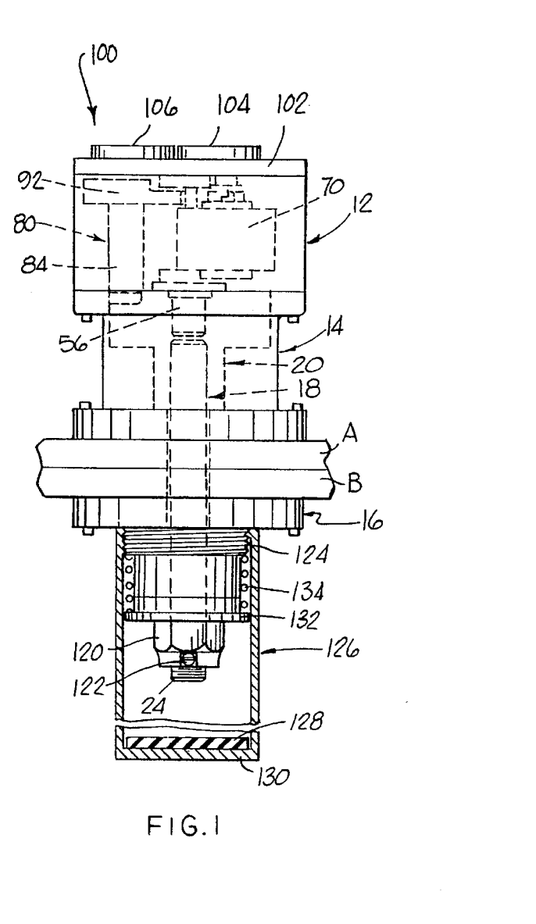
FIG. 1 is an elevation view illustrating a preferred embodiment of the present invention separably fastening two flanges showing some of the internal components schematically and showing the bolt catcher/cap sectioned to reveal the retractor housing.

As shown in FIG. 1, the separable connector 100 is used to separably connect a structural surface A to structural surface B, both of which are exaggerated for clarity. One intended use of the present invention is to separably connect a spacecraft to its orbital or launch booster. As such, the structural surface A may represent a spacecraft surface and structural surface B may represent a booster surface, or vice versa. Another intended use of the present invention is to deploy a spacecraft component, such as a high gain antenna or a solar array, from its mooring to the spacecraft. Thus structural surface A may represent a spacecraft surface and structural surface B an surface of the component to be deployed. However, it is intended that the present invention may be embodied in many embodiments, including in embodiments of much simpler design than the preferred embodiments illustrated in FIGS. 1–13 and described herein, and further it is intended that the present invention be used in any application wherein it is desired to separate one surface from another. By way of example only, some land, sea and air applications of the present invention would include buoy detachment, ballast release, ocean payload separation, robotics arm release, instrument recovery, disentanglement, safety valve release, cargo handling and lashing, drilling operations, remote emergency operations, instrument release from scientific balloons, ejections seat/canopy release, and remote parachute detachment. The present invention is particularly useful in applications wherein it is desired to have a controlled separation with minimal shock occurring during separation.

The separable connector 100, as shown in FIG. 1, utilizes three housings. A latch housing 12, is conventionally mounted to a flywheel nut housing 14. The flywheel nut housing 14, in turn, is conventionally mounted to the flange A. A separate retractor housing 16 is conventionally mounted to flange B. As shown schematically in FIG. 1, and as more fully described herein, a connecting member 18 extends through openings defined in the retractor housing 16, the flanges A, B, and the flywheel nut housing 14 and separably connects to a rotatable body 20, or flywheel nut, which is rotatably supported in the flywheel nut housing 14. In this manner, flanges A, B and separably connected.

Figure 2:
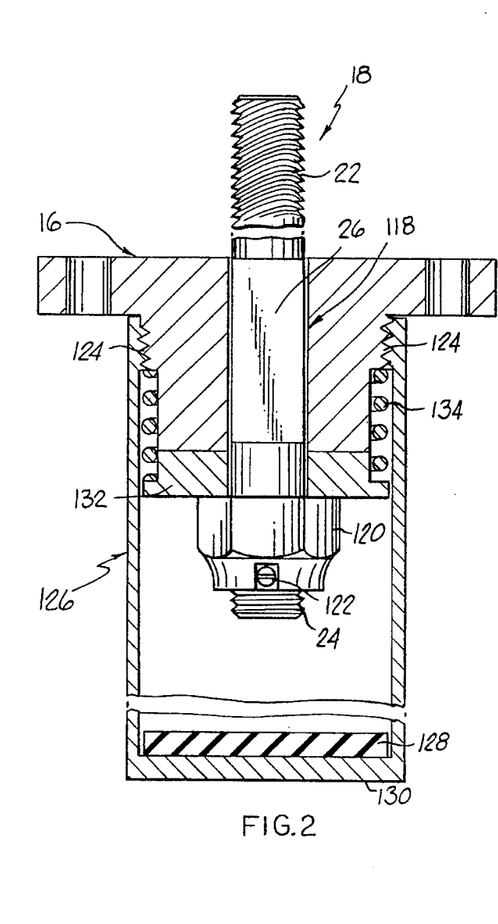
FIG. 2 is an enlarged sectional view of the retractor housing and bolt catcher/cap of FIG. 1.

Referring to FIG. 2, the connecting member 18 of separable connector 100 is shown as a unitary body having a threaded release end 22, a threaded pre-loading end 24, and a middle portion 26 defined therebetween. The middle portion 26 is provided with a non-circular cross-sectional shape, which is preferably rectangular as shown. Specifically referring to FIGS. 5, 6, and 9, the flywheel nut 20 includes a cylindrical hub 28 which defines a lower threaded bore 30 co-axial with flywheel nut's rotational axis. The lower bore 30 is threaded to match the threading of the release end 22 to threadably connect the flywheel nut 20 and the connecting member 18.

When the connecting member 18 is connected to the flywheel nut 20 and tensioned to a selected pre-load, strain energy is stored in the joint created therebetween. It is important to the practice of this invention this strain energy be quickly released in a manner which minimizes the shock caused due to separation. Accordingly, during separation, a significant portion of the strain energy is transferred into rotational kinetic energy of the flywheel nut 20. Since the amount of energy a rotating object can hold as rotational kinetic energy increases directly with its mass moment of inertia, a flywheel nut 20 includes a generally flat load bearing surface 32 extending radially from the hub 28 having a mass ring 34, or rim portion, supported circumferentially about the load bearing surface. In this manner, mass is spaced away from the hub 28 to increase the mass moment of inertia of the flywheel nut 20. It will be understood the flywheel nut can vary in configuration and mass to yield a selected mass moment of inertia. It is preferable that the configuration be generally dynamically balanced so that the flywheel nut 20 can spin uniformly about its axis of rotation.

Figure 5:
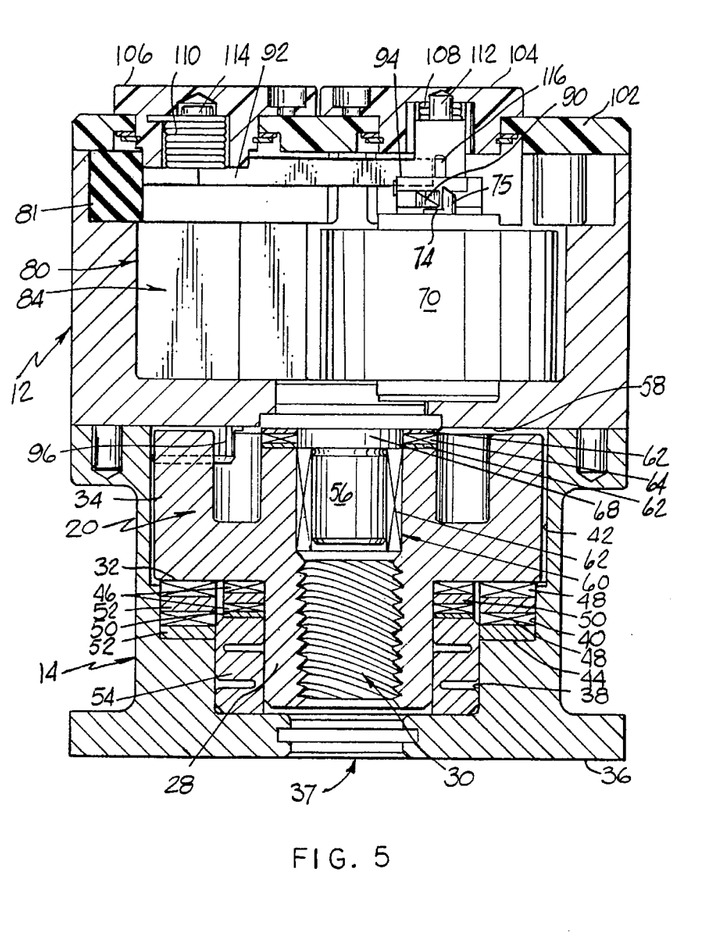
FIG. 5 is a section view of the latch housing taken along the lines 5—5 of FIG. 3, and of the flywheel nut housing taken through its center.
Figure 6:
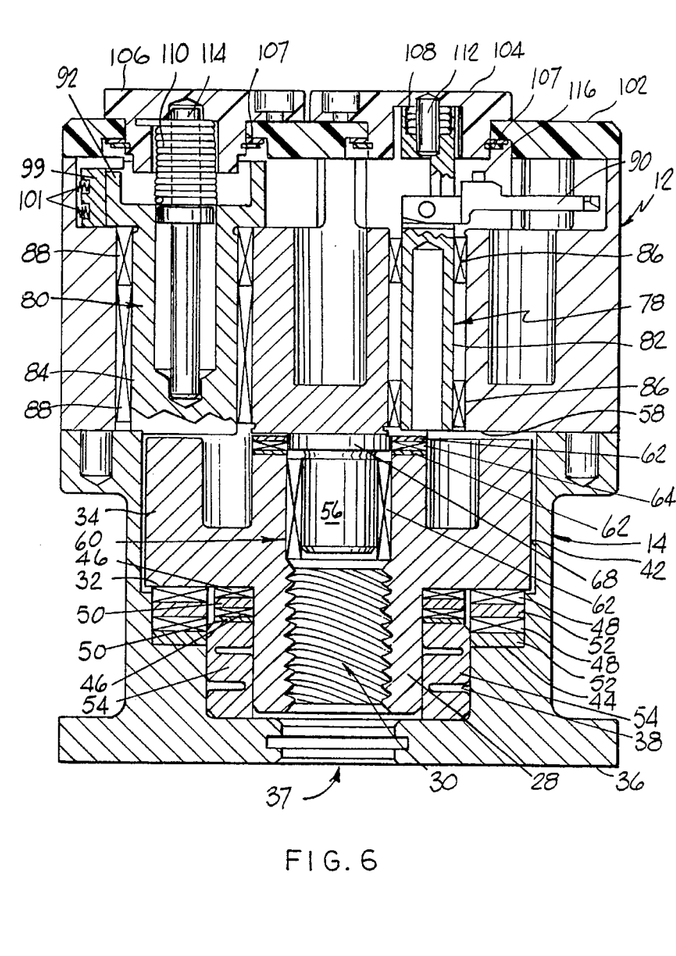
FIG. 6 is a section view of the latch housing taken along the lines 6—6 of FIG. 4, and of the flywheel nut housing taken through its center.
Figure 9:
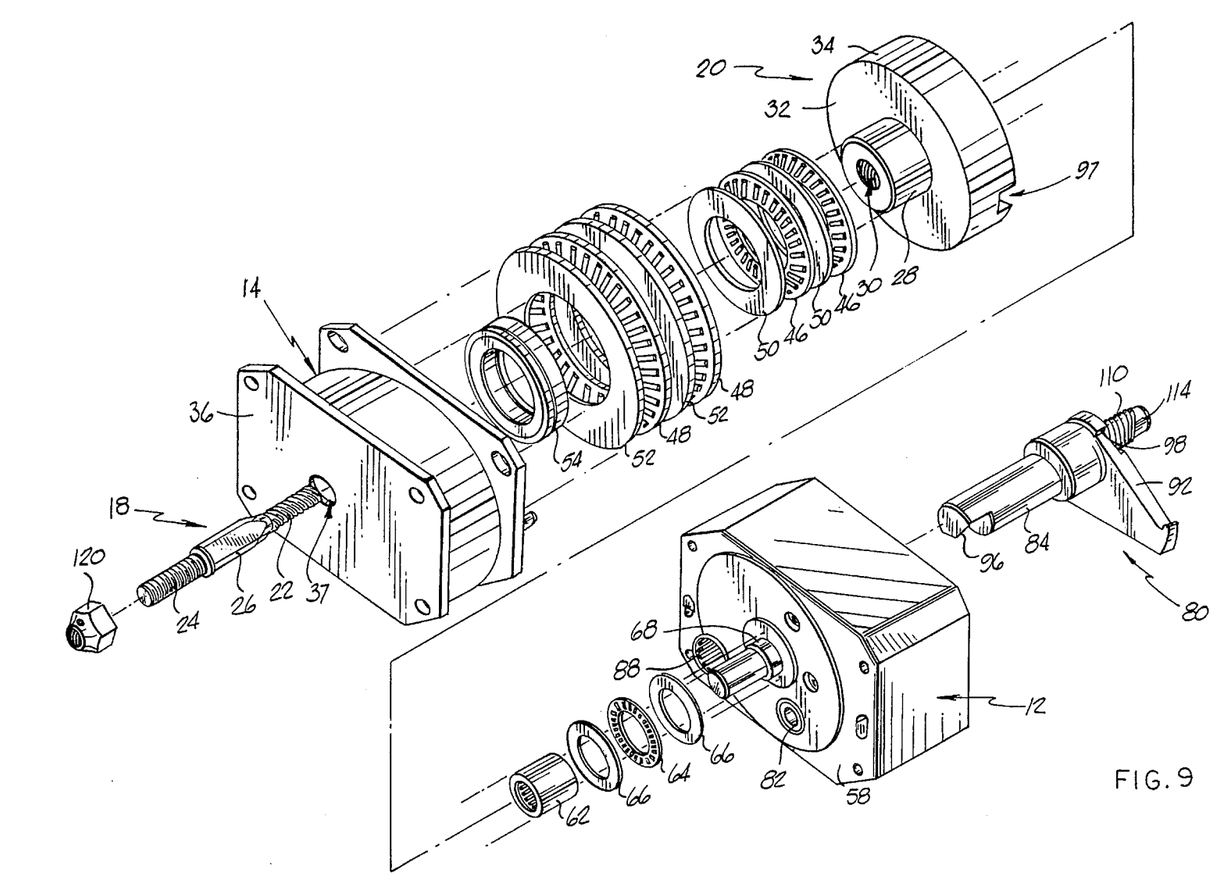
FIG. 9 is an exploded view of several components of the embodiment of FIG. 1.

As shown in FIGS. 5, 6, and 9, the flywheel nut housing 14 defines a bottom wall 36 having a central opening 37 to permit the release end 22 therethrough. The interior of flywheel nut housing 14 further defines central passageways stepped to three successive diameters. The first passageway is defined by interior wall 38, the second passageway is defined by interior wall 40, and the third passageway is defined by interior wall 42. The upper surface of bottom wall 36 provides a horizontal support surface extending across the diameter of interior wall 38, and the housing 14 further defines a horizontal support surface 44 extending between interior walls 38 and 40.

To allow the flywheel nut 20 to be rotatably supported in the flywheel nut housing 16 such that it rotates easily, means are provided to decrease friction between its load bearing surface 32 and its supporting surfaces in the flywheel nut housing 14. More specifically, the flywheel nut 20 is disposed in the housing 14 with its load bearing surface 32 resting on redundant pairs of inner 46 and outer 48 roller bearing rings. The roller bearing rings 46, 48 are preferably comprised of needle roller bearings. The load bearing surface 32 acts as the race for the topmost bearing rings. As shown, the inner bearing rings are separated by a washer 50 with an additional washer 50 acting as the race for the lowermost inner bearing ring. The outer bearing rings are separated by a washer 52 with an additional washer 52 acting a race for the lower outer bearing ring. With the above provided redundancy, if one of the inner bearing rings 46 fails, the other still provides rolling friction; similarly, if one of the outer bearing rings 48 fails, the other still provides rolling friction.

A slotted spring element 54 disposed about the hub 28 within the first passageway is laterally retained by wall 38. The inner bearing rings 46 are disposed about the hub 28 resting upon the spring element 54 with the topmost inner bearing ring in registry with the load bearing surface 32. The flywheel nut 20 is thus axially supported by the spring element 54 and inner bearing rings 46 directly against the upper surface of bottom wall 36. The spring element 54 is sized such that the inner bearing rings 46 are the first to carry load when tension is applied to member 18 and to limit the maximum load carried thereby due to the selected stiffness of the spring element. The outer bearing rings 48 are disposed about the hub 28 within the second passageway, laterally retained by wall 40, and axially supported on support surface 44 with the topmost outer bearing ring 48 in registry with the load bearing surface 32. The flywheel nut 20 is thus rotatably supported within the flywheel nut housing 14 with its rim portion 34 disposed within the third passageway. The flywheel nut 20 is sized to provide a clearance between the rim portion 34 and the wall 42. While low friction has been preferably provided by roller bearings in the present embodiments of this invention, it is contemplated that low friction could be provided by other means such as by the use of ball bearings, tapered roller thrust bearings, or a durable low friction coating between contacting surfaces for example. Furthermore, while the preferable bearing configuration illustrated in separable connector 100 employs redundant pairs of inner and outer bearing rings, it is contemplated that other bearing configurations may be employed in the practice of the present invention such as, by way of example only, a single redundant bearing ring pair or even a single bearing ring.

To laterally restrain the flywheel nut 20 about its rotational axis, an axle 56 extends from a bottom wall 58 of the latch housing 12. The hub 28 also defines an upper bore 60, coaxial with its axis of rotation, which houses the axle 56 when the latch housing 12 is mounted to the flywheel nut housing 14. As best illustrated in FIG. 9, a needle roller bearing collar 62 is snugly disposed inside the upper bore 60 about the axle 56 to rotatably mount the hub 28 about the axle. The hub 28 is also rotatably supported against the bottom wall 58 of the latch housing 12 with an additional thrust bearing ring 64 configured between thrust washers 66, the configuration disposed about a base portion 68 of the axle 56 in registry with the bottom wall 58 and the top of the hub 28. Thus, the upper end of the flywheel nut 20 is also rotatably supported.

To cause the strain energy of the joint due to tensile loading of the connecting member 18 to be converted into rotational kinetic energy of the flywheel nut, the present invention discloses an important feature. The thread geometry of the release end 22, and the matching thread geometry of the threaded bore 30, are selected such, when engaged, a tensile load applied on the release end is resolved into backdriving torque applied to the flywheel nut 20. In other words, the applied torque is greater than the sum of the resistive torques on the flywheel nut 20 due to the thread friction between the release end 22 and the threaded bore 30 and due to the load bearing friction between its load bearing surface 32 and support surfaces. Thus, the flywheel nut is urged to rotate when a tensile force is applied to the threaded end 22. As will be appreciated, the amount of tensile force resolved as backdriving torque will vary depending on thread geometry, for a given thread coefficient of friction. As will be apparent to those of ordinary skill in the art, the following design rules will generally apply:

$T_{FW} > T_{BF}$ $T_{FW}$ = applied torque to flywheel due to load, accounting for thread friction $T_{BF}$ = resistive torque of the flywheel due to friction at the load bearing surface $T_{FW} = (PD_p/2)(\cos\theta_N \tan\alpha - \mu_T)/(\cos\theta_N + \mu_T \alpha)$ P = tensile load (pre-load)

$D_p$ = thread pitch diameter

L = thread lead $\mu_T$ = thread coefficient of friction $\alpha$ = thread helix angle = $\tan^{-1}(L/(\pi D_p))$ $\theta_N$ = thread normal pressure angle $\theta_N = \tan^{-1}(\tan\theta\cos\alpha)$ $\theta$ = thread angle For the bearing configuration shown, $T_{BF} = \mu_B (r_{IB}P_{IB} + r_{OB}P_{OB})$ $\mu_B$ = bearing coefficient of friction $r_{IB}$ = effective radius of the inner bearing ring $r_{OB}$ = effective radius of the outer bearing ring $P_{IB}$ = load carried by the inner bearing ring $P_{OB}$ = load carried by the outer bearing ring Some general preferable thread geometry ranges in the practice of the present invention include thread angles ranging between 0°–7°, helix angles ranging between 18°–45°, and bolt thread leads ranging between $0.5D_p$ advancement/turn to $1.5D_p$ advancement/turn. The important criteria is that selected thread geometry generates, under load, a sufficiently high torque to overcome the rotationally resistive load bearing friction torque of the flywheel nut 20 and the resistive torque due to the thread friction from the threaded engagement of the release end 22 and bore 30. As such, it may be useful to apply a friction reducing coating on the threads to reduce the thread friction therebetween when engaged. It will be advantageous in the practice of the present invention to keep the thread friction and load bearing friction as low as possible.

Figure 3:
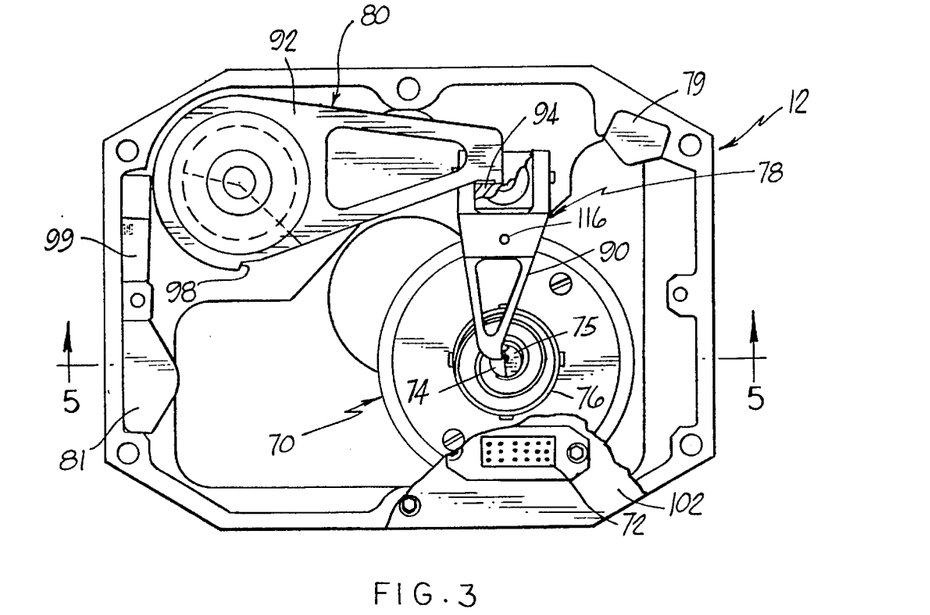
FIG. 3 is a plan view of the latch housing of FIG. 1, with the cover partially broken away, and showing the latches in a latched state.
Figure 4:
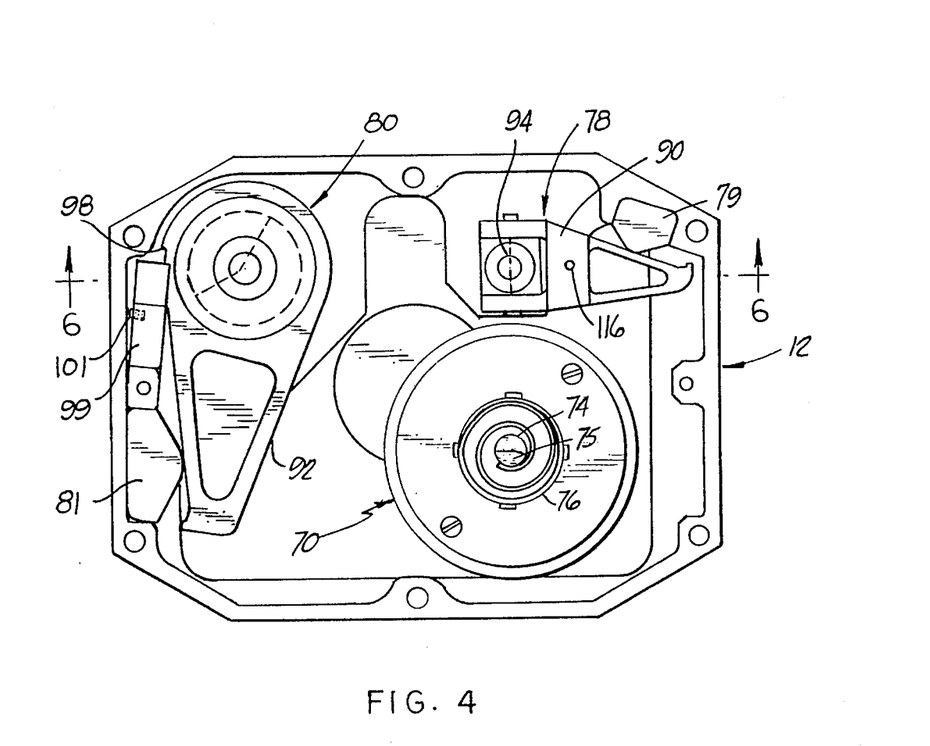
FIG. 4 is a is a plan view of the latch housing of FIG. 1 with the cover removed, and showing the latches in an unlatched state with the solenoid energized.

Referring to FIGS. 5, 6, and 9, taken together with FIGS. 3 and 4, the latch housing 12 houses means for releasably restraining the flywheel nut 20 to prevent the flywheel nut from rotating until released. Accordingly, in embodiment 10, a rotary solenoid actuator 70 is rigidly mounted to an interior surface of the latch housing 12 and connected to a power line via pin connector 72. A dynamically balanced rotary actuator is preferably utilized rather than a linear actuator to minimize the risk of accidental mechanical actuation, as during vibration. One suitable solenoid 70 was selected from the BTA Models Size 5EX, provided by Lucas Ledex of Vandalia, Ohio. One advantage to using a solenoid actuator is that the solenoid need only be energized for a brief time during actuation, typically on the order of milliseconds. In that time, the power consumed is on the order of about between 0.5 to 1 joules. This is a low enough power draw to not require a large power source, is a high enough draw to substantially reduce the possibility of accidental triggering due to electrical noise, to which other types of actuators are sometimes susceptible.

Figure 7:
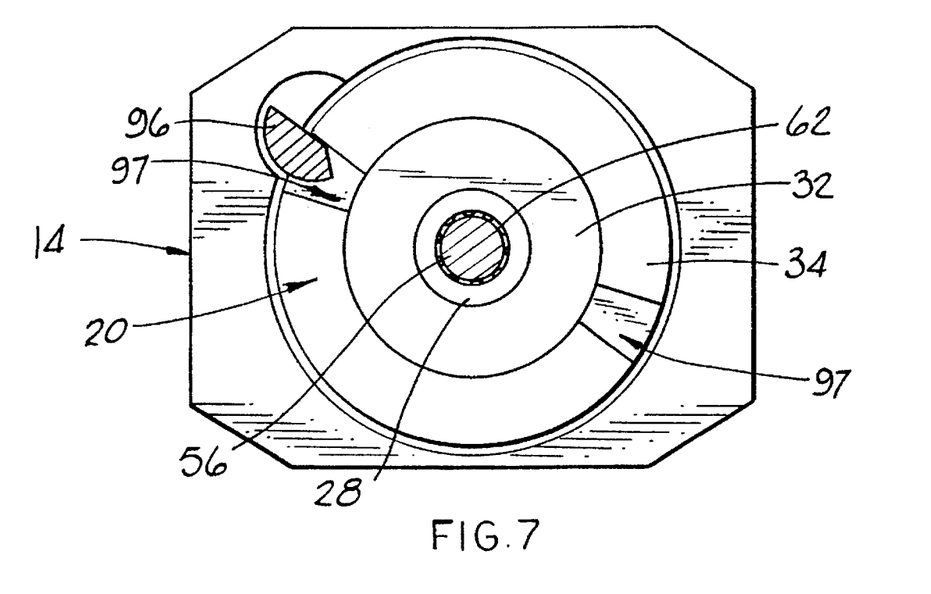
FIG. 7 is a schematic plan view of the flywheel nut housing with the latch housing cut away showing the flywheel nut engaged with a latch and restrained.

Referring specifically to FIGS. 3, 5, 6 and 7, the solenoid 70 is not energized. Its longitudinal output shaft 74 is configured with an end portion having a flat latching surface 75 and is held in a first position by means of a redundant reset springs 76 engaging the shaft 74 respectively on either side of the solenoid housing. A pair of latches 78, 80 each including a latch shaft 82, 84, are rotatably mounted within a respective cylindrical passageway defined in the latch housing 12 with a needle roller bearing collar 86, 88 disposed between the respective latch shaft and the passageway wall. A lever arm 90 extends from the latch shaft 82 and has an end engagable against the flat surface 75 of the shaft 74, contacting the shaft at its rotational axis. A lever arm 92 extends from the latch shaft 84 and has an end engagable against a stop 94 provided on lever arm 90 contacting the stop spaced from the rotational axis of latch shaft 82. Referring specifically to FIGS. 3, 5 and 7, the latch shaft 84 extends through an opening in bottom wall 58 and is provided with a tip 96 engagable with either of a pair of opposed slots 97 defined in rim portion 34 and rotatable into and out of engagement with the slot wall. Referring specifically to FIG. 7, when the latches 78, 80 are latched, and the tip 96 is engaged with a slot wall, the backdriving torque applied to the flywheel nut 20 biases latch 80 in a clockwise direction which it is prevented from travelling in due to the engagement of lever arm 92 against the stop 94 on latch 78. Lever arm 92, thus, asserts a counter-clockwise torque onto latch 78 biasing latch 78 in a counter-clockwise direction which it is prevented from travelling in due to the engagement of lever arm 90 with the flat surface 75 of solenoid shaft 74 However, because the tip of lever arm 90 contacts the flat surface 75 at the shaft's 74 rotational axis, no torque is transmitted from the flywheel nut 20 to the solenoid 70. As will be appreciated by the foregoing, latch 78 is prevented from rotating by the flat latching surface 75 of shaft 74, latch 80 is prevented from rotating by the stop, and the flywheel nut 20 is prevented from rotating by the tip 96.

Figure 8:
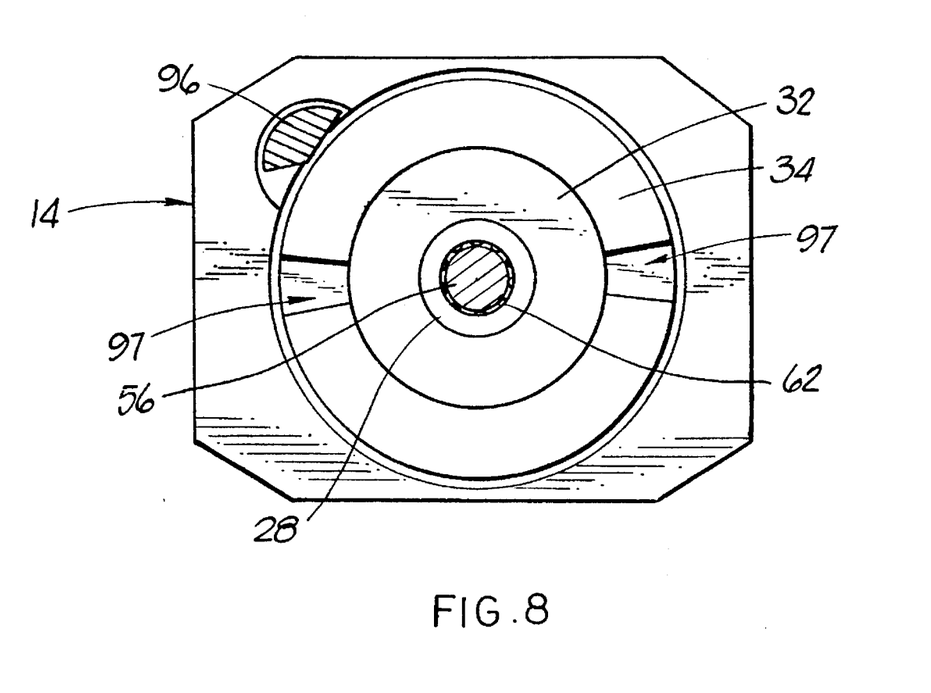
FIG. 8 is a schematic plan view of the flywheel nut housing with the latch housing cut away showing the flywheel nut disengaged with the latch and rotating.

Turning to FIGS. 4, 6, and 8, which illustrates the latches 78, 80 unlatched allowing the flywheel nut 20 to rotate. More specifically, the solenoid 70 is momentarily energized causing its dynamically balanced internal rotor (not shown) to be pulled clockwise (90° against an internal stop) with a sufficient torque to overcome the counter-clockwise torque of the reset springs 76 which causes the shaft 74 and the latching surface 75 to rotate 90°. The end portion of the shaft 74 is relieved back from the center of rotation of the shaft to provide sufficient clearance for the lever arm 90 to rotate; thus the rotation of shaft 74 frees latch 78 to swing counterclockwise against a first rubber damper 79, which in turn frees latch 80 to swing clockwise against a second rubber damper 81. During the rotation of latch 80, the tip 96 rotates out of engagement with the wall of the slot 97 to which it was engaged and the flywheel nut 20 is thereby released and allowed to rotate. As shown, the base of lever 92 is notched from a first diameter to a smaller diameter to define a catch surface 98. An anti-kickback arm 99, pinned to the latch housing 12, is biased against the lever base with provided springs 101. When latch 80 is unlatched, the catch surface 98 rotates past the arm 99, the arm is urged from the larger to the smaller diameter to block the catch surface 98 to prevent the possibility of the tip 96 accidentally re-engaging the slot on the rim portion 28. When the solenoid 70 is de-energized, the shaft 74 is biased back to its first position by the reset springs 76. It will be appreciated than any number of latching or actuation arrangements may be utilized in the practice of the present invention and that the foregoing represents simply a preferable latching/actuation arrangement. For example, in lower pre-load applications, the shaft 74 of solenoid 70 could be directly used to releasably restrain the flywheel nut 20 from rotating.

A preferred feature of separable connector 100 is that the latches 78, 80 are able to be reset back to a latched state from the exterior of the apparatus. A transparent cover 102 mounted to the top of the latch housing 12 is provided so that the engagement of the latches may be visually verified. Reset caps 104, 106 are rotatably secured to the exterior of the transparent cover 102 as with provided washer/snap ring assemblies 107. Each reset cap defines a respective passageway to house a respective torsion spring 108, 110. Each torsion spring 108, 110 is mounted about a respective mandrel 112, 114 and torsionally connects a respective latch shaft 82, 84 to a respective reset cap 104, 106. The reset caps 104, 106 may be turned to rotate a respective latch 78, 80 to a latchable position. As will be appreciated, latch 80 is first reset to a latchable position. Then, latch 78 is reset to its latchable position. To facilitate this latter operation, lever arm 90 is pinned to its latch shaft 82 so that it may rise over a sloped end of the shaft 74 when rotated into its latchable position. However, to prevent accidental disengagement of the lever arm 90, as when the separable connector 100 is under vibration, the lever arm 90 is provided with a pin 116 in near registry with a wall of the reset cap 104 to strike the wall to prevent excessive translation of the lever arm. After being used to reset the latches, the reset caps may also be selectively turned to tension the torsion springs 108, 110 so that if tension is accidentally lost in member 18 the latches 78, 80 will still release. The caps may then be locked to the transparent cover with fasteners (not shown) through provided bores to prevent accidental turning.

Referring to FIG. 1, for separable connector 100, the retractor housing 16 provides structure against which the member 18 may be tensioned. The housing 16 additionally defines a central passageway 118 having a cross-section shape matching the middle portion 26, preferably rectangular, and sized to permit the middle portion therein to prevent the release end 22 from rotating out of engagement with the hub 28 by the generated backdriving torque. The release end 22 thus will not rotate during separation when any part of the middle portion 26 is disposed within the central passageway 118. The central passageway 118 however, will allow the middle portion 24 to translate therethrough during separation. As shown, a threaded nut 120 threadably engages the pre-load end 24 of the connecting member 18 in a conventional manner and may be tightened against the retractor housing 20 to apply the selected tensile load, or pre-load to the member to tension the connecting member when connected to the flywheel nut 20. The pre-load nut 120 is also provided with a fastener 122 to lock it to the member 24 to prevent accidental disengagement, as during vibration of the separable connector.

The retractor housing 16 is further provided with external threading 124 on which an optional bolt catcher/cap 126 is threadably engagable to catch and retain at least the pre-load end 24 of the connecting member 18 after separation. A damper 128 disposed inside the cap 126 against end wall 130 absorbs the impact of the pre-load end 24 against the wall. A spacer 132 disposable within the cover cap 126 has a lip extending in near registry with the inner wall of the cap 126. A provided spring 134 is disposed about the housing 16 with one end reacting against the lip and another end reacting against a wall associated with the external threading 124. The spring 134 urges the spacer 132 against the nut 120 to retain the pre-load end 24 against the lower wall 130 after separation. The spring 134 is also sized such that will maintain a sufficient independent tension on connecting member 18 to allow the flywheel 20 to revolve and separation to take place even if tension is otherwise accidentally lost on the member.

In the operation of separable connector 100, the release end 22 of connecting member 18 is inserted into the lower bore 30 of the flywheel nut 20 and the member and flywheel nut are threadably connected. The middle portion 26 of the connecting member 18 is disposed within the central passageway 118 of housing 16 and the tip 96 of latch 80 is rotated into engagement with a selected slot 97 on the flywheel nut 20. The latches 78,80 are reset to their latched position to prevent the flywheel nut from rotating. The pre-load nut 120 is threadably engaged to the pre-load end 24 of the connecting member 18 and is tightened, urging the spacer 132 against the bottom of the housing 16, to place the member under a selected tensile load. This causes a compressive load in the flywheel nut 20, rotatably supported in the flywheel nut housing 14 which joins the structural surfaces A, B. The joint is thus under strain. The tensile force on the member 18 is resolved by the selected thread geometry of the release end 22 as a torque applied to the flywheel nut 20 (and the member 18). The torque is sufficiently high as to bias the flywheel nut 20 and the member 18 to rotate, which both are restrained from so doing. The cap 126 is screwed onto the external threading 124 on the housing 16. When separation is desired, the solenoid actuator 70 is energized, causing the levers 78,80 to unlatch to free the flywheel nut 20. The torque applied to the flywheel 20 due to the thread geometry causes the flywheel nut 20 to begin rotating, which quickly releases the pre-load (and hence the strain ) on connecting member 18, causing it translate relative to the flywheel nut. The strain energy in the joint is quickly converted into rotational kinetic energy in the flywheel nut 20 due to the applied torque. In this manner, the strain energy stored in the joint between the connecting member and flywheel nut is transferred into rotational kinetic energy of the flywheel nut and into translational, kinetic energy of the translating member. The translation of the member, combined with the simultaneous rotation of the flywheel nut, allows the release end 22 to threadably disengage from the threaded bore 30 allowing the structural surfaces A, B to separate. The member 18 strikes the damper 128 and is at least partially retained in the cap 134. In the practice of the present invention, it will not be unusual for the separation to take place within 20 milliseconds, nor will it be unusual for the flywheel nut to be spinning at greater than 5,000 RPM at separation under certain pre-loads. It is estimated that if the release end 22 has a thread lead of 1" of advancement/turn, and if the flywheel nut has an effective rim portion diameter three times the thread pitch diameter of the release end, more than 90% of the strain energy in the joint in excess of that dissipated as thermal energy generated by thread and bearing friction will be converted into rotational kinetic energy of the flywheel nut 72 with less than 10% converting into translational kinetic energy of the ejected member, even assuming the mass of the flywheel nut to be no greater than the mass of ejected member (and pre-load nut or other associated hardware). For the purposes of this specification, translational kinetic energy of the connecting member includes the kinetic energy due to the pre-load nut or other associated hardware which translates with the connecting member.

FIGS. 10 and 11, illustrate an alternate separable connector 200 in which the connecting member 202 is comprised of a first 204 and second 206 joinable portions. More specifically, the first portion 204 includes a threaded release end 208 threadably engagable with threaded bore 210 of hub portion 212 of flywheel nut 213, each having the selected thread geometry and characteristics previously described to resolve a tensile load on the connecting member 202 into a backdriving torque in the manner previously described. Extending from the release end 208 is a carrier 214, or socket. An anti-rotation pin 216 extends laterally from the carrier 214 and is slidably retained in a slot 218 provided in a modified flywheel housing 220 to prevent the release end 208 from rotating while allowing it to translate. The second portion 206 includes a first end 222, or ball end, which is adapted to be seated in the carrier 214, and an opposite threaded pre-load end 224. When seated in the carrier 214, the ball end 222 is longitudinally retained thereby and laterally retained by a wall 225 of the housing 220. Thus, with the flywheel nut 213 latched and prevented from rotating, the connecting member 202 may be tensioned to connect flanges A, B. When the flywheel nut is unlatched, the release end 208 is translated out of engagement with the flywheel nut, thus allowing the carrier 214 to move downward until the pin 216 bottoms out against the lower end of slot 218. The ball end 222 also moves downward and, when no longer laterally retained by the wall 225, uncouples from the carrier 214, as shown, allowing flanges A and B to separate. One advantage to this embodiment 200 is that it allows ready compensation for minor axial misalignment in the connection between the connecting member and the flywheel nut. Another advantage to this embodiment is that the release end 208 does not exit the housing 220, thus minimizing the risk of thread contamination and binding in its threaded engagement in bore 210. It will be understood that many suitable joint styles and types will allow portions 204, 206 to be joined to each other according to the needs of this embodiment.

FIGS. 12 and 13 illustrate another embodiment 300 in which the solenoid rotary actuator 70 of embodiment 100 is replaced with a spring/pulley system and the double latch system of embodiment 100 is replaced with a latch system utilizing a single latch 302 rotatably mounted within the latch housing 304 and configured similarly to latch 80 in embodiment 100. As shown, a provided non electrically conductive housing subassembly 306, shown sectioned and partially broken away in FIGS. 12, 13, is mounted within the latch housing 304. A pulley cable 308 extends through provided openings in subassembly 306 and is rigidly mounted about a shaft 310 with a collar 312. The shaft 310 is rotatably mounted to the latch housing 304 and is provided with a flat surfaced end portion 314 engagable in a first position with lever arm 316. A first end plate 318 is mounted to one end of the pulley cable and a second end plate 320 is mounted to the other end. A conventional spring 322 extends from end plate 318 against a wall 324 of the subassembly 306. A second spring 326 comprised of a conventional shape memory metal extends from end plate 320 to the wall 324 and is connected to a power source so that current may be passed therethrough to heat the spring to its transition temperature.

In the latched configuration, shown in FIG. 12, the shape memory spring 326 is in its martensinic state and has less spring force than the conventional spring 322. Thus, the conventional spring 32 biases the pulley cable 308 to rotate the shaft 310 clockwise until the collar 312 registers against a first stop 328. In this orientation, the lever arm 316 is engaged with end 314 and the flywheel nut (not shown) is prevented from rotating in the manner previously described. To unlatch the latch 302 to release the flywheel nut, current is applied to the shape memory spring 326 to heat it past its transition temperature to transition the spring to its austenitic state. As illustrated in FIG. 13, the spring 326 is elongated and overcomes the spring force of conventional spring 322 to pull the shaft 310 counterclockwise until the collar 312 registers against a second stop 330, causing the latch 302 to release the flywheel nut. The shape memory spring 326, when cooled, returns to its martensinic state and the actuation system can be re-used.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus, it should be understood that this invention is not to be limited to the exact forms disclosed and many changes in detail and construction of the invention may be made without departing from the spirit thereof.

I claim:

1. A separable connector comprising:

a connecting member including a threaded end having a selected thread geometry including a selected thread pitch diameter, thread lead, thread angle, and helix angle;

a rotatably supported body threadably engagable with said threaded end connecting to said member;

means for releasably restraining said rotatably supported body preventing said body from rotating until released;

means for restraining said threaded end from rotating; and means for applying a selected tensile load to said member, wherein, with the member and the rotatably supported body engaged to form a connection, and with a tensile load applied to the member causing the connection to be strained, the selected thread geometry causes the tensile load to be resolved as a torque applied to the rotatably supported body sufficient to cause the body to rotate when released allowing the threaded end to translate out engagement with the rotatably supported body allowing the connection to separate.

2. A separable connecting apparatus, as claimed in claim 1, wherein said selected helix angle is between 18 degrees and 45 degrees.

3. A separable connecting apparatus, as claimed in claim 1, wherein said selected thread angle is between 0 degrees and 7 degrees.

4. A separable connecting apparatus, as claimed in claim 1, wherein said selected thread lead is between 0.5 thread pitch diameters and 1.5 thread pitch diameters advancement per turn.

5. A separable connecting apparatus, as claimed in claim 1, wherein said rotatably supported body has a selected mass moment of inertia and said selected thread geometry is such that less than ten percent of the strain energy stored in the connection between the member and the rotatably supported body not dissipated as heat due to friction is converted into translational kinetic energy of the connecting member during separation.

6. An apparatus for separably connecting a first surface to a second surface comprising:

a translatable connecting member having a first threaded end;

a rotatable body threadably engagable with said first threaded end and rotatably supported against said first surface for rotation about said threaded end;

an actuator controllable from a first state to a second state;

latch means cooperative with said actuator for engaging said rotatably supported body with said actuator in said first state restraining said body from rotating and for disengaging said body with said actuator in said second state allowing said body to rotate;

means for restraining said first threaded end from rotating; and means for applying tensile load to said connecting member, wherein, with the connecting member and the rotatably supported body engaged to form a connection, and with a tensile load applied to the connecting member causing stain energy to be stored in the connection, the tensile load is resolved as a torque applied to said rotatably supported body sufficient to cause said rotatable body to rotate when released, said threaded end translating out of engagement with said rotatably supported body separating the connection.

7. An apparatus, as claimed in claim 6, wherein said rotatably supported body comprises:

a threaded hub portion;

a load bearing surface extending radially from said hub portion; and a mass supported about said hub portion on said load bearing surface.

8. An apparatus, as claimed in claim 7, wherein said rotatable body is rotatably supported on bearing means disposed between said load bearing surface and said first surface.

9. An apparatus, as claimed in claim 6, wherein:

said connecting member is unitary and includes a second threaded end and a middle portion provided with a non-circular cross sectional shape defined between said first and second threaded ends;

said means for restraining said first threaded end from rotating includes a passageway having a cross-sectional shape selectively sized and configured relative to said middle portion to restrain said member from rotating when said middle portion is disposed therein; and said means for applying a tensile load includes a nut threadably engagable with said second threaded end for tightening against said second surface tensioning said connecting member.

10. An apparatus as claimed in claim 9, further comprising a cap mountable to said second housing and retaining at least a portion of said connecting member when ejected towards said cap during separation.

11. An apparatus, as claimed in claim 6, wherein said member comprises:

first and second joinable portions;

said first joinable portion includes said first threaded end and is further provided with an opposite carrier end; and said second joinable portion includes said second threaded end and is further provided with a opposite end joinable with said carrier end of said first portion joining said second portion to said first portion.

12. An apparatus, as claimed in claim 6, wherein:

said actuator is a rotary actuator.

13. An apparatus, as claimed in claim 12, wherein said rotary actuator comprises;

a rotary solenoid provided with a longitudinal shaft rotatable from a first position to a second position when said solenoid is energized; and means biasing the shaft back to the first position when the solenoid is de-energized and holding the shaft in the first position until the solenoid is re-energized.

14. An apparatus, as claimed in claim 12, wherein said rotary actuator comprises:

a rotatably mounted shaft;

a pulley cable mounted about the shaft;

a first spring connected to one end of the pulley cable biasing the shaft to a first position; and a second spring comprised of a shape memory metal connected to the opposite end of said pulley cable biasing the shaft to a second position when heated from a martensinic state to an austenitic state.

15. An apparatus, as claimed in claim 6, wherein said latch means comprises:

a rotatably mounted latch having a first end engagable with the actuator in the first actuator state and disengagable with the actuator in the second actuator state; and a second end configured to engage the rotatable body when the first end is engaged with the actuator and to release the rotatable body when the first end has rotated through a selected arc after having disengaged the actuator.

16. An apparatus, as claimed in claim 6, wherein said latch means includes:

first and second cooperating rotatably mounted latches;

said first latch having a stop surface and an end engagable with the actuator in the first actuator state and disengagable with the actuator in the second actuator state;

said second latch having a first end engagable with said stop surface with said first latch engaged with the actuator and disengagable with said stop surface with said first latch disengaged with the actuator;

said second latch also having a second end configured to engage the rotatable body with said first end engaged with said stop surface and to release the rotatable body with said first end rotated through a selected arc after having disengaged said stop surface.

17. An apparatus, as claimed in claim 6, further including:

means for resetting said latch means; and means for visually verifying the engagement state of said latch means.

18. In an apparatus for separably connecting a first surface to a second surface including a connecting member having a threaded end, a rotatable body to be rotatably supported against the first surface for rotation about the threaded end to separably connect the connecting member comprising:

a hub portion threadably engagable with the connecting member having a selected thread geometry matching the threaded end such that, with the connecting member and the rotatably supported body engaged to form a connection, and the rotatably supported rotatable body and the threaded end restrained from rotating, a tensile load applied to the connecting member, causing strain energy to be stored in the connection, is resolved as a torque applied to said rotatably supported body sufficient to cause said body to rotate about the threaded end when released, allowing the threaded end to threadably disengage said rotatably supported body and translate relative thereto and separate the connection therewith.

19. A rotatable body, as claimed in claim 18, having a selected mass moment of inertia and a selected thread geometry such that greater than ninety percent of the strain energy stored in the connection and not dissipated as heat due to friction is converted into rotational kinetic energy of said rotatable body.

20. A method of separably connecting a first surface to a second surface comprising the steps of:

providing a translatable connecting member having a threaded end;

providing a body threadably engagable with the threaded end and rotatably supported for rotation about the threaded end;

threadably engaging the threaded end of the connecting member to the rotatably supported body forming a connection between the body and the member;

applying a selected tensile load to the connecting member causing strain energy to be stored in the connection formed between the member and the rotatably supported body;

releasably restraining the rotatably supported body from rotating;

restraining the threaded end from rotating; and releasing the rotatable body to allow it to rotate, the —strain—energy stored in the connection in excess of that dissipated as —heat—due to friction being converted into rotational kinetic energy of the rotatably supported body and translational kinetic energy of the connecting member, the threaded end translating out of engagement with the rotatable body allowing the connection to separate.

21. A method, as claimed in claim 1, further including the step of:

selecting the thread geometry of the threaded end and the mass moment of inertia of the rotatably supported body such that the portion of strain energy converted into rotational kinetic energy of the body exceeds that converted into translational kinetic energy of the connecting member.

22. A method, as claimed in claim 21, wherein said step of selecting the thread geometry and mass moment of inertia includes selecting the thread geometry and mass moment of inertia such that less than ten percent of the strain energy stored in the connection not dissipated as heat due to friction is converted into translational kinetic energy of the connecting member.

23. A method, as claimed in claim 1, wherein sad step of providing a rotatably supported body includes the steps of:

providing a rotatable body having a load bearing surface;

rotatably supporting the rotatable body against said first surface on bearings disposed between the load bearing surface of the rotatable body and said first surface.

* * * * *